United States Patent
Fu et al.

(10) Patent No.: US 7,244,694 B2
(45) Date of Patent: Jul. 17, 2007

(54) VISCOELASTIC FLUIDS CONTAINING NANOTUBES FOR OILFIELD USES

(75) Inventors: Diankui Fu, Missouri City, TX (US);
Keith Dismuke, Katy, TX (US);
Stephen Davies, Sugar Land, TX (US);
Ann Wattana, Sugar Land, TX (US)

(73) Assignee: Schlumberger Technology Corporation, Sugarland, TX (US)

( * ) Notice: Subject to any disclaimer, the term of this patent is extended or adjusted under 35 U.S.C. 154(b) by 463 days.

(21) Appl. No.: 10/932,958

(22) Filed: Sep. 2, 2004

(65) Prior Publication Data

US 2006/0046937 A1     Mar. 2, 2006

(51) Int. Cl.
*C09K 8/04* (2006.01)
*C09K 8/62* (2006.01)

(52) U.S. Cl. .............. 507/269; 507/239; 507/240; 507/244; 507/266; 507/211; 507/213; 507/215; 507/217; 507/224; 507/922; 507/926; 166/278; 166/308.3; 166/103; 166/140; 977/902

(58) Field of Classification Search ............... None
See application file for complete search history.

(56) References Cited

U.S. PATENT DOCUMENTS

| | | | |
|---|---|---|---|
| 4,725,372 A | 2/1988 | Teot et al. | 252/8.514 |
| 4,796,702 A | 1/1989 | Scherubel | 166/308 |
| 5,258,137 A | 11/1993 | Bonekamp et al. | 252/356 |
| 5,551,516 A | 9/1996 | Norman et al. | 166/308 |
| 5,964,295 A * | 10/1999 | Brown et al. | 166/308.2 |
| 5,979,555 A | 11/1999 | Gadberry et al. | 166/270.1 |
| 6,258,859 B1 * | 7/2001 | Dahayanake et al. | 516/77 |
| 6,399,546 B1 | 6/2002 | Chang et al. | 507/240 |
| 6,433,075 B1 | 8/2002 | Davies et al. | 524/815 |
| 6,482,866 B1 | 11/2002 | Dahayanake et al. | 516/77 |
| 6,605,570 B2 | 8/2003 | Miller et al. | 507/211 |
| 6,703,352 B2 | 3/2004 | Dahayanake et al. | 507/241 |
| 6,762,154 B2 | 7/2004 | Lungwitz et al. | 507/131 |
| 2006/0041028 A1 * | 2/2006 | Crews | 516/135 |
| 2006/0293434 A1 * | 12/2006 | Yodh et al. | 524/495 |

FOREIGN PATENT DOCUMENTS

CA          1298697          4/1992

* cited by examiner

*Primary Examiner*—Philip C. Tucker
(74) *Attorney, Agent, or Firm*—Darla Fonseca; David Cate; Robin Nava (57) ABSTRACT

The present invention relates to viscoelastic fluids that contain nanotube structures that may be used advantageously as oilfield stimulation fluids in many different applications, most particularly as a fracturing fluid. Viscoelastic fluid compositions of the present invention include an aqueous medium, a viscoelastic surfactant, an organic or inorganic acids, or salt thereof, organic acid salts, inorganic salts, and a nanotube component. The invention is also called to a methods of treating a subterranean well bores in which the viscoelastic fluid is injected into the wellbore to perform operations such as fracturing, drilling, acid fracturing, gravel placement, removing scale, matrix acidizing, and removing mud cake. Further, a method of preparing a nanotube viscoelastic fluid comprising the steps of effectively mixing a carbon nanotube component into a viscoelastic fluid, and sonicating the mixture in order to incorporate the carbon nanotube component is claimed.

27 Claims, 3 Drawing Sheets

VISCOELASTIC FLUIDS CONTAINING NANOTUBES FOR OILFIELD USES

BACKGROUND OF THE INVENTION

1. Field of the Invention

This invention relates to viscoelastic fluids, in particular, viscoelastic oilfield stimulation fluids containing nanotubes.

2. Description of the Related Art

Various types of oilfield stimulation fluids are used in operations related to the development, completion, and production of natural hydrocarbon reservoirs. These operations include fracturing subterranean formations, modifying the permeability of subterranean formations, or sand control. The oilfield stimulation fluids employed in these operations are known as drilling fluids, completion fluids, work over fluids, packer fluids, fracturing fluids, drilling fluids, conformance or permeability control fluids, and the like.

Viscoelastic fluids are useful for carrying particles from one region of the formation, for instance, the wellbore or surface equipment, to another. As an example, one of the functions of a drilling fluid is to carry drilling cuttings from around the drilling bit out of the wellbore to the surface. Viscoelastic fluids also play an essential role for instance in gravel packing placement. Gravel packing essentially consists of placing a gravel pack around the perimeter of a wellbore across the production zone to minimize sand production from highly permeable formations.

In the recovery of hydrocarbons from subterranean formations it is common practice, particularly in formations of low permeability, to fracture the hydrocarbon-bearing formation to provide flow channels, using viscoelastic fluids. These flow channels facilitate movement of the hydrocarbons to the wellbore so that the hydrocarbons may be produced from the well. Fracturing involves breaking a portion of the surrounding strata, by injecting a fluid directed at the face of the geologic formation, at pressures sufficient to initiate and/or extend a fracture in the formation. A fracturing fluid typically comprises a proppant, such as ceramic beads or sand to hold the fracture open after the pressure is released. It is therefore important for the viscoelastic fluid to have viscosity properties sufficient to suspend and carry the proppant into the fracture zone, and at the environmental conditions present in the zone.

Viscoelastic surfactant fluids are normally made by mixing in appropriate amounts suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate due to intermolecular attraction, or non-covalent bonds (i.e. hydrogen bonding and van der waals forces), to form species such as micelles. The micelles can further interact, also by intermolecular attraction, to form a network exhibiting elastic behavior. In the remaining part of this description, the term "micelle" will be used as a generic term for the organized interacting species.

The viscoelasticity of the surfactant solutions forms rapidly on mixing the various components. If the resulting viscosity of the viscoelastic gel is too high, handling or placement can become difficult. Conversely, when viscosity is too low, other difficulties may be presented, for example, the viscoelastic gel may not transport other components or materials effectively. Any application of viscoelastic surfactant solutions related to transport or placement after their preparation would benefit from a method of controlling their viscosities and gel times.

Micellar viscoelastic fluids have limited use for fracturing high permeability formations. In such environments, low concentrations of viscoelastic surfactants in fracturing fluids may not be sufficient to preclude fluid losses into the porous media of the high permeability formations due to low viscosity properties, thus requiring high concentrations of viscoelastic surfactant to maintain sufficient viscosity to limit fluid loss. This is especially the case at higher fracture zone temperatures; for example, up to about 110° C. Hundreds of thousands to millions of gallons of fracturing fluid must typically be pumped down the wellbore to fracture such wells. The result is a significant increase in cost and resource requirements for the operation. Fluid lost to the formation may also problems with the function or technique of the fracture. For example, the undesirable loss of fluid into the formation limits the fracture size and geometry that can be created during the fracturing pressure pumping operation. Thus, the total volume of the fracture, or crack, is limited by the lost fluid volume that is lost into the rock, because such lost fluid is unavailable to apply volume and pressure to the rock face.

Therefore, the need exists for oilfield stimulation fluids with low viscoelastic surfactant concentrations with sufficient viscosity properties that can perform at higher temperatures, resist fluid loss into the formation, and increase hydrocarbon production. A fluid that can achieve the above while improving the precision with which fluids are delivered, and reduce equipment or operational requirements, would be highly desirable, and the need is met at least in part by the following invention.

SUMMARY OF THE INVENTION

It has been discovered that viscoelastic surfactant fluids that contain nanotube structures may be used advantageously as oilfield stimulation fluids in many different applications, most particularly, fracturing fluids. In particular, this invention relates to viscoelastic nanotube fluid compositions containing an aqueous medium, a viscoelastic surfactant, an organic or inorganic acid, or salt thereof, and a nanotube component.

The invention is also called to a method of fracturing a subterranean formation where the viscoelastic nanotube fluid is pumped through wellbore and into a subterranean formation at a pressure sufficient to fracture the formation. The viscoelastic fluid may then undergo a rheological change in the formation, thereby decreasing the viscosity of the fluid within the formation. The well is flowed back, and hydrocarbons are produced from the subterranean formation.

The invention further relates to methods of treating a subterranean well bores in which the viscoelastic nanotube fluid is injected into the wellbore to perform operations such as drilling, acid fracturing, gravel placement, removing scale, and matrix acidizing.

A method of preparing a viscoelastic nanotube fluid comprising the steps of effectively mixing a carbon nanotube component into a viscoelastic fluid, and sonicating the mixture in order to incorporate the carbon nanotube component is also claimed.

DETAILED DESCRIPTION OF THE PREFERRED EMBODIMENTS

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components others than the ones already cited. In the summary of the invention and this detailed description, each numerical value should be read once as modified by the term "about" (unless already expressly so modified), and then read again as not so modified unless otherwise indicated in context.

The invention provides oilfield stimulation fluids; in particular, viscoelastic fluids containing carbon nanotube with improved Theological properties, also termed viscoelastic nanotube fluids. Operations of particular interest are those related to the development, completion, and production of natural hydrocarbon reservoirs. These operations include fracturing subterranean formations, modifying the permeability of subterranean formations, or sand control. Other applications comprise the placement of a chemical plug to isolate zones or complement an isolating operation. The oilfield stimulation fluids employed in these operations are known as drilling fluids, completion fluids, work over fluids, gravel packing fluids, fracturing fluids, conformance or permeability control fluids, and the like.

The viscoelastic nanotube fluid compositions of the invention are particularly useful as fracturing fluids. Fracturing is a term that has been applied to a variety of methods used to stimulate the production of fluids such as oil, natural gas, etc., from subterranean formations. In fracturing processes, a fracturing fluid is injected through a wellbore and against the face of the formation at a pressure and flow rate at least sufficient to overcome the overburden pressure and to initiate and/or extend a fracture(s) into the formation. The fracturing fluid usually carries a proppant such as sand, bauxite, glass beads, etc., suspended in the fracturing fluid and transported into a fracture. The proppant then keeps the formation from closing back down upon itself when the pressure is released. The proppant filled fractures provide permeable channels through which the formation fluids can flow to the wellbore and thereafter be withdrawn. Viscoelastic fluids have also been extensively used in gravel pack treatment.

Conventional guar based fluids, can leave residual guar deposited on the fracture face that leads to poor clean-up, decreased permeability, and leak-off of water into the formation. In comparison, viscoelastic surfactant fluids leave negligible residue on the fracture face which gives excellent permeability and clean-up. However, excessive fluid loss may occur where formation temperatures are too high to maintain adequate fluid viscosity. Such a decrease in viscosity leads to poor proppant suspension and delivery, and the need for increased fluid volumes with increased surfactant concentration. Further, excessive fluid loss is detrimental. When the ratio of aqueous fluid to viscosifier is changed by such large fluid losses, problems in maintaining the integrity of the fluid occur. This is particularly a problem in relatively high permeability formations, wherein the mobility of the fluid is high. It is an object of this invention to provide a viscoelastic oilfield stimulation fluid with effective viscosity at high temperatures, and little or no residue following completion of the fracturing treatment.

For oilfield stimulation fluids, it is common to impart viscoelasticity by micelle formation. Such micelles may be, for example, worm-like, rod-like, spherical, or cylindrical micelles in solution. The formation of long micelles creates useful viscosity properties at an array of temperatures. Thus, it is desirable to control the micelle formation to obtain suitable length.

It has been discovered that the use of nanotubes, also known as tubular nanostructures, impart increased viscosity into viscoelastic surfactant fluid compositions at elevated formation temperatures. While this invention and its claims are not bound by any particular mechanism of operation or theory, it appears that the micellar structure, which provides fluid viscosity, is enhanced with the use of nanotubes. Nanotubes are unique cylindrical structures with remarkable electronic and mechanical properties. Nanotubes typically have relatively small diameters as compared with their length, commonly referred to as large aspect rations. Since nanotubes have large aspect ratios, when mixed with a viscoelastic surfactant solution, in theory, the elongated tubular structure may serve as rod-like bridges between micelles or even simply serve as template for micelles to grow longer. Viscoelastic surfactant solutions containing these micelles and nanotubes exhibit increased viscosity properties, and remain more stable at high formation temperatures.

Embodiments of the present invention comprise fluid compositions of an aqueous viscoelastic nanotube fluid. The fluid includes an aqueous medium of water, a salt (which forms a brine carrier fluid), a viscoelastic surfactant capable of forming micelles, and a nanotube component.

Any nanotube, which effectively increases fluid viscosity properties at temperatures up to about 150° C., may be used in the embodiments of the invention. A wide variety of nanotube technologies may be employed, such as, but not limited to, nanotubes based upon carbon, boron nitride, metal dichalcogenides, titanium oxide, gallium nitride, magnesium oxide, indium oxide, tungsten oxide, magnesium borate, zinc sulfides, and the like. Carbon nanotubes (CNT) are preferred. Nanotubes can also be functionalized by treatment with a diene or known functionalizing reagents. Further, the nanotube structure can be treated to obtain a hydrophilic or hydrophobic surface depending on the intended use.

Carbon nanotubes may be formed by pyrolysis of a carbon-containing gas such as ethylene, acetylene or carbon monoxide. Preferably the nanotubes are grown at 600 to 1000° C., with tube length increasing with time. For higher purity, growth is conducted in alternating cycles of tube growth and oxidation to remove amorphous carbon. If desired, the nanotubes may be treated such as by heating in air to form an oxidized surface. Preferably the surface is oxidized to a sufficient extent to make the surface hydrophilic, preferably with a static contact angle of less than 30°

Carbon nanotubes useful in the invention may be either single walled or multiple walled nanotubes. Any available grade of carbon nanotubes may be used. Examples of available carbon nanotubes which are suitable for use in the invention include, but are not limited to, single walled carbon nanotubes available from Carbon Nanotechnologies Incorporated, 16200 Park Row, Houston, Tex., 77084; multi-walled CNT (15 nm in diameter), multi-walled CNT (10 nm in diameter), single-walled CNT (2 nm in diameter), double-walled CNT (2.8 nm in diameter), available in a range of purities from about 70% to 95%, including various functional group modifications, from Nanocyl S. A. Rue du Séminaire, 22B-5000 Namur, Belgium; and, double-walled CNT (1.3-2 nm×5 nm×0.5-50 mm), single-walled CNT (0.7-1.2 nm×2-20 mm) available in a range of functional group modifications, from Sigma-Aldrich, 3050 Spruce St., St. Louis, Mo., 63103.

The carbon nanotubes employed in the invention may be modified with functional groups, such as a, but not necessarily limited to, carboxylic acid, amino, ester, fluoride, bromide, chloride, nitroxide, hydroxyl, saturated hydrocarbons, unsaturated hydrocarbons, and the like, and any mixtures thereof. Also, benzyl functional carbon nanotubes may be used. When benzyl functional carbon nanotubes are used, the benzyl groups may be further functionalized with any of the aforementioned functional groups.

When incorporated into viscoelastic surfactant fluids of the invention, carbon nanotubes, or any suitable nanotubes for that matter, are incorporated in any amount effective to achieve the desired viscosity properties at applicable formation temperatures. By desired viscosity properties, it is meant fluid viscosity that is high enough to conduct the operation at the formation environmental conditions. Effective nanotube amounts may typically be up to 2% by weight of the total fluid composition. Preferably, the nanotube may be incorporated in an amount ranging from about 0.1% to 1% by weight, more preferably 0.05% to 0.5%.

The surfactant component of the viscoelastic fluid of the present invention comprises at least one surfactant selected from the group consisting of cationic, anionic, zwitterionic, amphoteric, nonionic and combinations thereof, such as those cited in U.S. Pat. No. 6,435,277 (Qu et al.) and U.S. Pat. No. 6,703,352 (Dahayanake et al.), each of which are incorporated herein by reference. The surfactants, when used alone or in combination, are capable of forming micelles that form a structure in an aqueous environment that contribute to the increased viscosity of the fluid (also referred to as "viscosifying micelles"). Unless otherwise specified under the respective combination surfactant systems, reference is to be made to the surfactant descriptions under the respective surfactant type.

Cationic surfactants that may be useful in the invention have the structures:

wherein $R_1$ represents alkyl, alkenyl, arylalkyl, hydroxyalkyl and alkylene oxide wherein each of said alkyl groups contain from about 8 to about 24 carbon atoms, more preferably at least 16 carbon atoms, and may be branched or straight chained and saturated or unsaturated, and wherein the branched alkyl groups have from about 1 to about 6 carbon atoms. Representative of alkyl group for $R_1$ include decyl, dodecy, tetradecyl (myristyl), hexadecyl (cetyl), octadecyl (oleyl), stearyl, erucyl, and the derivatives of coco, tallow, soya, and rapeseed oils. $R_2$, $R_3$ and $R_4$ are independently a hydrogen or an aliphatic chain preferably from 1 to about 30 carbon atoms, more preferably from 1 to about 10 carbon atoms and most preferably from 1 to about 6 carbon atoms in which the aliphatic group can be branched or straight chained, saturated or unsaturated. Representative chains are methyl, ethyl, benzyl, hydroxyethyl, hydroxypropyl, as well as hydroxyethyl and hydroxypropyl oligomers.

Examples of other cationic surfactants include salts of the amine corresponding to the formula wherein $R_1$, $R_2$ and $R_3$ are the same as defined hereinbefore, and $X^-$ is an inorganic or organic anion; and, a quaternary ammonium salt of the amine corresponding to the formula wherein $R_1$, $R_2$, $R_3$, and $R_4$ and $X^-$ are the same as defined, and the $R_2$, $R_3$ and $R_4$ groups of the amine salt and quaternary ammonium salt may also be formed into a heterocyclic 5- or 6-member ring structure which includes the nitrogen atom of the amine.

A preferred cationic surfactant is eurycyl (Z)-13 docosenyl-N-N-bis (2-hydroxyethyl) methyl ammonium chloride. Other cationic surfactants may be employed either alone or in combination in accordance with the invention, including, but not limited to, erucyl trimethyl ammonium chloride; N-methyl-N,N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis (hydroxyethyl) ammonium 3,4,-dichlorobenzoate;cetyl tris (hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; cetylamino; N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

The concentration of surfactants with 12 to 16 carbon atoms as the hydrophobic group can range from about 0.5% to about 15% by weight of the fluid, more preferably from about 4% to about 15% and most preferably from about 5% to about 10%. The brine concentration can range from about 0.5% to about 25%, more preferably from about 3% to about 25%, and even more preferably from about 5% to about 25%. The concentration of surfactants with 18 to 24 carbon atoms as the hydrophobic group ranges from about 0.2% to about 10% by weight of the fluid, more preferably from 0.5% about to about 6% and most preferably from about 0.5% to about 5%. The brine concentration can range from 0 to about 10%, more preferably from about 1% to about 7% and even more preferably from about 1% to about 5%.

The fluid also can comprise one or more member from organic acid and/or salt thereof, and/or inorganic salts. Typical concentration for these groups of additives is from zero percent to about 20% by weight, more typically from zero percent to about 10% by weight and even more typically from zero percent to about 5% by weight.

Examples of suitable nonionic surfactants have the structures:

wherein $R_5$ is hydrogen or a hydrocarbon chain containing from about 1 to about 5 carbon atoms and may be branched or straight chained and saturated or unsaturated; m, n and p can be from 1 to 30, preferably from 5 to 30, more preferably from 15 to 30; and wherein q, r, and s represent the number of the repeating units and could be from zero to about 150.

The concentration of such oligomeric surfactants preferably ranges from about 0.5% to about 40%, more preferably from about 2% to about 30% and most preferably from about 5% to about 25%. Brine concentration ranges from zero to about 10%.

Yet other suitable nonionic surfactants include amines corresponding to the representative formula:

wherein $R_6$ is at least about a $C_{16}$ aliphatic group which may be branched or straight chained and which may be saturated or unsaturated, $R_7$ and $R_8$ are each independently, a hydrogen or a $C_1$ to about $C_6$ aliphatic group which can be branched or straight chained, saturated or unsaturated, and which may be substituted with a group that renders the $R_7$ and/or $R_8$ group more hydrophilic.

Examples of such amines include bis(hydroxyethyl) soya amine; N-methyl, N-hydroxyethyl tallow amine; bis(hydroxyethyl) octadecyl amine; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; and N-hydroxyethyl cosyl amine.

Zwitterionic surfactants useful in the invention may have the representative structure:

wherein $R_9$ is an alkyl, alkenyl, arylalkyl, or hydroxyalkyl group wherein each of said alkyl groups contain from about 8 to about 24 carbon atoms and may be branched or straight chained and saturated or unsaturated; and wherein $R_{10}$ and $R_{11}$ are independently a hydrogen or an aliphatic chain having from about 1 to about 30 carbon atoms, wherein the aliphatic group can be branched or straight chained, saturated or unsaturated; and $R_{12}$ is alkylene or hydroxyalkylene group with chain length from zero to about 6. Zwitterionic surfactants with hydrophobic chain of 10 to 16 carbons are preferably used with a surfactant of a different type with a ratio of at least from 10:1 to 2:1 (zwitterionic to other surfactant).

The concentration for zwitterionic surfactants with a hydrophobic chain having from about 18 to about 24 carbons ranges from about 0.5% to about 15% and more preferably from about 1% to about 10% and most preferably from about 2% to about 10%. The brine concentration preferably ranges from about zero to about 20% and more preferably from about 5% to about 20%.

Other examples of suitable zwitterionic surfactants include the following structures:

-continued wherein $R_9$ has been previously defined herein, $R_{14}$ and $R_{15}$ are a hydrogen or a hydrocarbon chain containing from about 1 to about 5 carbon atoms and may be branched or straight chained and saturated or unsaturated. m and n can be from zero to about 30.

Examples of amphoteric surfactants that may be useful are represented by the structure:

wherein $R_{16}$ is an alkyl, alkenyl, arylalkyl, or hydroxyalkyl group wherein each of said alkyl groups contain from about 8 to about 24 carbon atoms and may be branched or straight chained and saturated or unsaturated; and wherein $R_{17}$ is a hydrogen or an aliphatic chain having from about 1 to about 30 carbon atoms, wherein the aliphatic group can be branched or straight chained, saturated or unsaturated.

Other specific examples of amphoteric surfactants include the following structures:

wherein $R_{16}$ has been previously defined herein, and $X^+$ is an inorganic cation such as $Na^+$, $K^+$, $NH_4^+$ associated with a carboxylate group or hydrogen atom in an acidic medium.

The fluid of the present invention may further comprise one or more members from the group of organic acids, organic acid salts, and inorganic salts. Mixtures of the above members are specifically contemplated as falling within the scope of the invention. This member will typically be present in only a minor amount (e.g. less than about 30% by weight of the fluid).

The organic acid is typically a sulfonic acid or a carboxylic acid and the anionic counter-ion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred as salicylate, phthalate, p-toluene sulfonate, hydroxynaphthalene carboxylates, e.g. 5-hydroxy-1-napthoic acid, 6-hydroxy-1-napthoic acid, 7-hydroxy-1-napthoic acid, 1-hydroxy-2-naphthoic acid, preferably 3-hydroxy-2-naphthoic acid, 5-hydroxy-2-naphthoic acid, 7-hydroxy-2-napthoic acid, and 1,3-dihydroxy-2-naphthoic acid and 3,4-dichlorobenzoate. The organic acid or salt thereof typically aids the development of increased viscosity that is characteristic of preferred fluids. The organic acid or salt thereof will typically be present in the viscoelastic fluid at a weight concentration of from about 0.1% to about 10%, more typically from about 0.1% to about 7%, and even more typically from about 0.1% to about 6%.

The inorganic salts that are particularly suitable for use in the viscoelastic fluid include water-soluble potassium, sodium, and ammonium salts, such as potassium chloride and ammonium chloride. Additionally, calcium chloride, calcium bromide and zinc halide salts may also be used. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. The inorganic salt will typically be present in the viscoelastic fluid at a weight concentration of from about 0.1% to about 30%, more typically from about 0.1% to about 10%, and even more typically from about 0.1% to about 8%. Organic salts, e.g. trimethylammonium hydrochloride and tetramethylammonium chloride, may also be used in addition to, or as a replacement for, the inorganic salts.

A sufficient quantity of a water miscible alcohol may be employed to further enhance viscoelastic properties. Preferably the alcohol is a $C_1$ to $C_{12}$ aliphatic alcohol. Examples of suitable alcohols include, but are not limited to, methanol, iso-propanol, iso-butanol, ethylene glycol, propylene glycol, and the like. Iso-propanol and methanol are preferred alcohols.

When used as a fracturing fluid, embodiments of the invention can also comprise proppant particles that are substantially insoluble in the fluids of the formation. Proppant particles carried by the fracturing fluid remain in the fracture created, thus propping open the fracture when the fracturing pressure is released and the well is put into production. Suitable proppant materials include sand, but are not limited to, walnut shells, sintered bauxite, glass beads, ceramic beads, or similar materials. Mixtures of suitable proppants can be used. If sand is used, it will typically be from about 20 to about 100 U.S. Standard Mesh in size. The concentration of proppant in the fracturing fluid can be any concentration known in the art, and will typically be in the range of from about 0.05 to about 3 kilograms of proppant added per liter of clean fluid.

Fracturing fluids based on the invention can also comprise a breaker. The purpose of this component is to "break" or diminish the viscosity of the fracturing fluid so that this fluid is more easily recovered from the fracture during clean-up. Exemplary breakers include citric acid as described in U.S. published patent application 2002/0004464 (Nelson et al.), published on filed on Jan. 10, 2002, which is incorporated herein by reference.

Viscoelastic nanotube fluids of the invention may further contain one or more additives such as surfactants, breaker aids, salts (e.g., potassium chloride), anti-foam agents, scale inhibitors, corrosion inhibitors, fluid-loss additives, and bactericides. Also optionally, the fracturing fluid can contain materials designed to limit proppant flowback after the fracturing operation is complete by forming a porous pack in the fracture zone. Such materials, herein "proppant flowback inhibitors," can be any known in the art, such as those available from Schlumberger under the trade name PROP-NET®.

The fluids may further contain a gas such as air, nitrogen or carbon dioxide to provide a foam or an energized fluid. Optionally, they may include a co-surfactant to increase viscosity or to minimize the formation of stable emulsions which contain components of crude oil or a polysaccharide or chemically modified polysaccharide, or an organic salt or alcohol, etc.

The fluids of the invention may further include viscosifying agents selected such as guar, guar derivatives, hydroxypropyl guar, carboxymethyl guar, carboxymethylhydroxypropyl guar, starch, starch derivatives, hydroxyethyl cellulose, carboxymethylhydroxyethyl cellulose, hydroxypropyl cellulose, xanthan, diutan, polyacrylates, polyDADMAC [poly(diallyl dimethyl ammonium chloride) and combinations thereof]), clay (Bentonite and attapulgite), and mixtures thereof. Such viscosifying agents may be in either linear or crosslinked forms.

The fluids of the invention can be utilized in oilfield operations as stimulation fluids, including methods of fracturing subterranean formations, modifying the permeability of subterranean formations, acid fracturing, matrix acidizing, gravel packing or sand control, and the like. Other applications comprise the placement of a chemical plug to isolate zones or complement an isolating operation.

The fracturing method of this invention uses conventional techniques. The disclosure of U.S. Pat. No. 5,551,516 (Normal et al.) is incorporated by reference. Oilfield applications of various materials are described in "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In another embodiment, the present invention relates to a method of gravel packing a wellbore. As a gravel packing viscoelastic nanotube fluid, it preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

The following examples are presented to illustrate the preparation and properties of aqueous viscoelastic nanotube fluids and should not be construed to limit the scope of the invention, unless otherwise expressly indicated in the appended claims. All percentages, concentrations, ratios, parts, etc. are by weight unless otherwise noted or apparent from the context of their use.

EXAMPLES

Examples A, B, and C

Using a 1 liter warring blender, 300 ml of the following viscoelastic surfactant fluid was prepared and then divided into three 100 ml portions.

| Ingredient | Weight % |
| --- | --- |
| Propane-1,2-diol | 0.3% |
| Propan-2-ol | 0.4% |
| Water (aqueous medium) | 98.1% |
| Eurycyl (Z)-13 Docosenyl-N-N-bis (2-Hydroxyethyl) Methyl Ammonium Chloride | 1.2% |

To a first 100 ml portion, 0.1% by weight single walled carbon nanotubes, available from Carbon Nanotechnologies Incorporated, was added to and blended for 2 minutes under low speed to prepare example A. To a second 100 ml portion, 0.2% by weight of the same carbon nanotube was added to and blended for 2 minutes under low speed to prepare example B. A third portion, was left untreated to form a control, example C. Then, mixtures underwent 80 minutes of sonication (all samples were sonicated for the same time to ensure that there is no artifact due to sonication). Then, 3% by weight of $NH_4Cl$ was added to all three examples, A, B and C. The viscosity was then measured on a Fann 50 rheometer over differing conditions.

Figure 1:
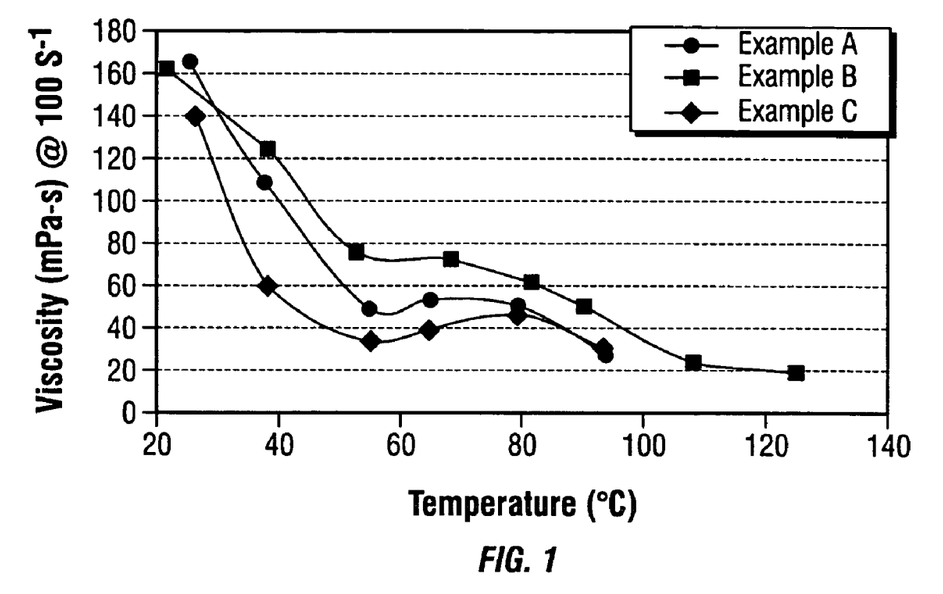
FIG. 1 shows resultant viscosity as a function of temperature at a shear rate of 100 s$^{-1}$ for two viscoelastic surfactant fluids that contain carbon nanotubes versus a control fluid without the addition of nanotubes.
Figure 2:
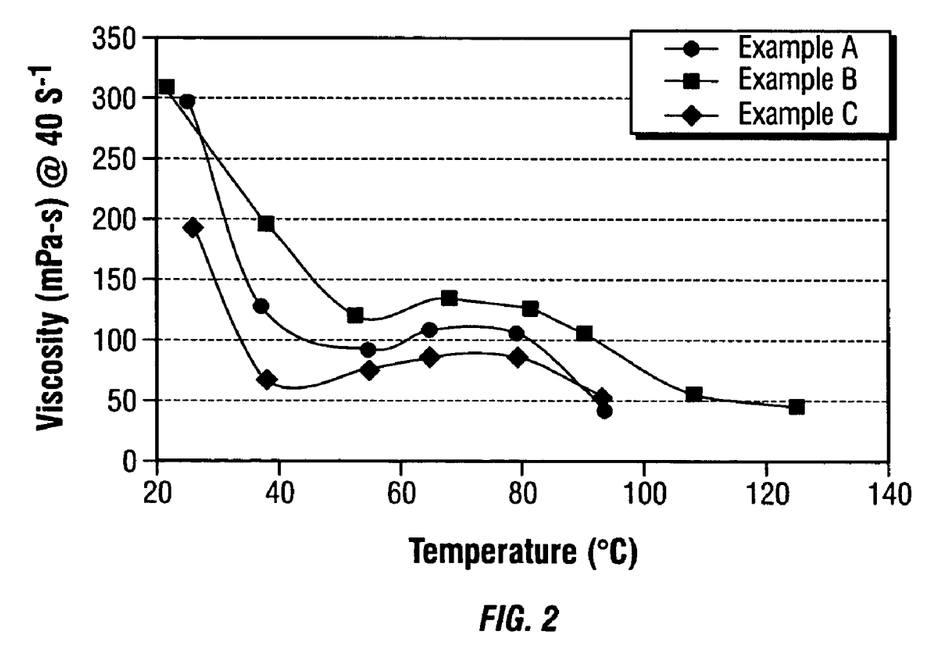
FIG. 2 shows viscosity as a function of temperature at a shear rate of 40 s$^{-1}$ for the same fluids as FIG. 1.

FIG. 1 and FIG. 2 show the viscosity properties of viscoelastic surfactant fluid examples A, B and C prepared above, as measured in units of millipascal-seconds (mPa-s) over a range of temperatures and at shear rates of 100 $s^{-1}$ and 40 $s^{-1}$, respectively. The data shows significant viscosity improvement, since viscosity is significantly higher at the same temperature, when the carbon nanotube component is incorporated. Further comparison of example B with example C demonstrates that similar viscosity properties are attained at about 20 to 25° C. higher fluid temperatures by incorporation of carbon nanotubes.

Examples D and E

In a 1 liter warring blender, 200 ml of the following viscoelastic surfactant fluid was prepared and then divided into two 100 ml portions.

| Ingredient | Weight % |
| --- | --- |
| Propane-1,2-diol | 0.3% |
| Propan-2-ol | 0.4% |
| Water (aqueous medium) | 98.1% |
| Eurycyl (Z)-13 Docosenyl-N-N-bis (2-Hydroxyethyl) Methyl Ammonium Chloride | 1.2% |

To a first 100 ml portion, 4% KCl was added to form example D. To a second 100 ml portion, 0.2% by weight single walled carbon nanotubes was added to and blended for 2 minutes under low speed, and then 4% KCl was added to prepare example E. Then, both mixtures underwent 80 minutes of sonication. The viscosity was then measured on a Fann 50 rheometer over several conditions.

Figure 3:
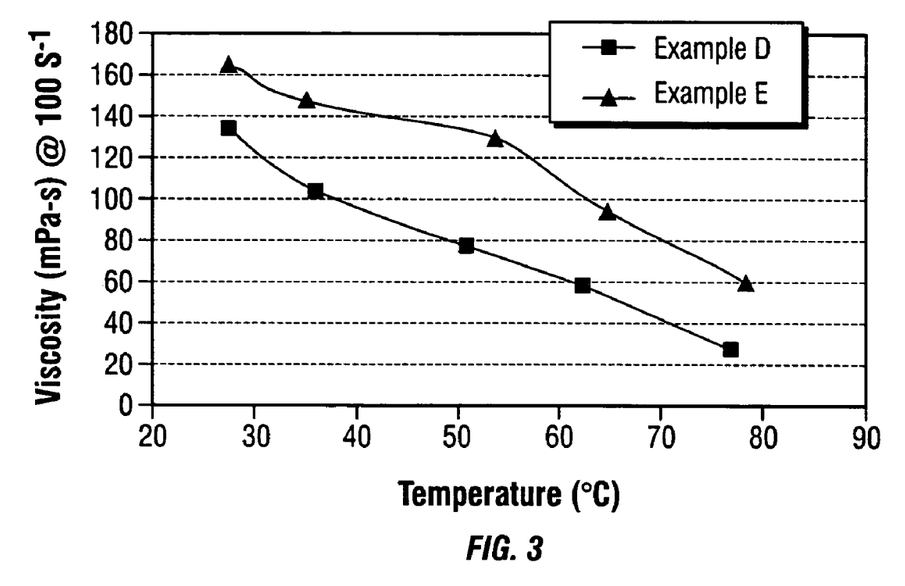
FIG. 3 illustrates viscosity as a function of temperature at a shear rate of 100 s$^{-1}$ for a second category of viscoelastic surfactant fluid that contains carbon nanotubes versus a control without nanotubes.
Figure 4:
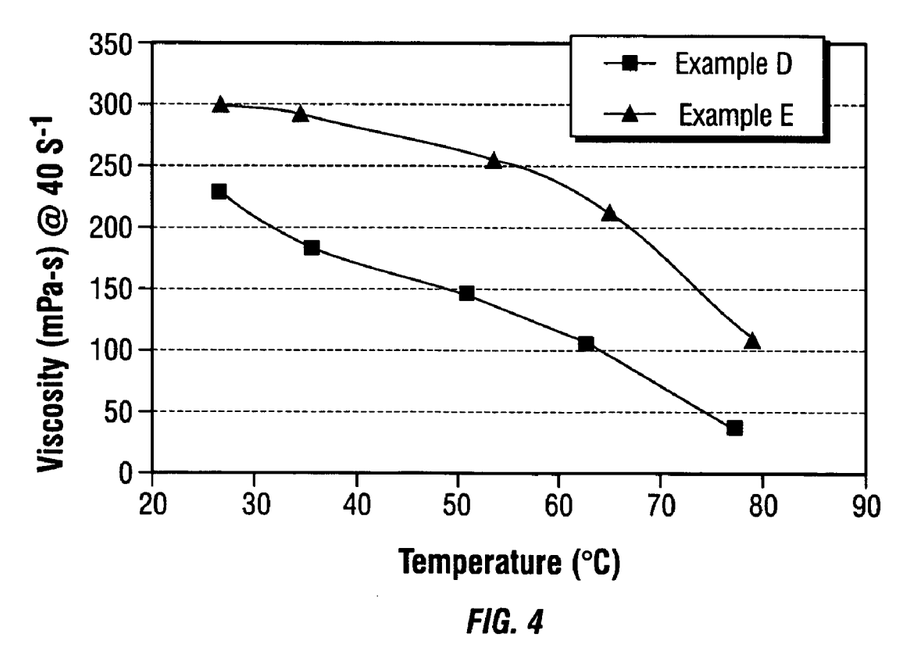
FIG. 4 shows viscosity as a function of temperature at a shear rate of 40 s$^{-1}$ for the same fluids as FIG. 3.

FIG. 3 and FIG. 4 show the viscosity properties of viscoelastic surfactant fluid examples D and E as measured over a range of temperatures and at shear rates of 100 $s^{-1}$ and 40 $s^{-1}$. The data shows significant viscosity increase at like temperature when the carbon nanotubes are incorporated. Comparing example E with example D indicates significantly higher viscosity properties are achieved via use of carbon nanotubes.

Examples F and G

To prepare samples F and G, 200 ml of the following viscoelastic surfactant fluid was prepared via warring blending and the separated into two 100 ml portions.

| Ingredient | Weight % |
|---|---|
| Isopropanol | 0.5 |
| Sodium Chloride | 0.2 |
| Water | 48.3 |
| Erucic amidopropyl dimethyl betaine | 1.0 |
| Propane-1,2-diol | 0.1 |
| Propan-2-ol | 0.1 |
| Water (aqueous medium) | 49.6 |
| Eurycyl (Z)-13 Docosenyl-N-N-bis (2-Hydroxyethyl) Methyl Ammonium Chloride | 0.2 |

6% KCl was added to a first 100 ml portion in order to make example F. To a second 100 ml portion, 0.2% by weight single walled carbon nanotubes was added to and blended for 2 minutes under low speed, and then 6% KCl was added to prepare example G. Then, both mixtures underwent 80 minutes of sonication. The viscosity was then measured on a Fann 50 rheometer over several conditions.

Figure 5:
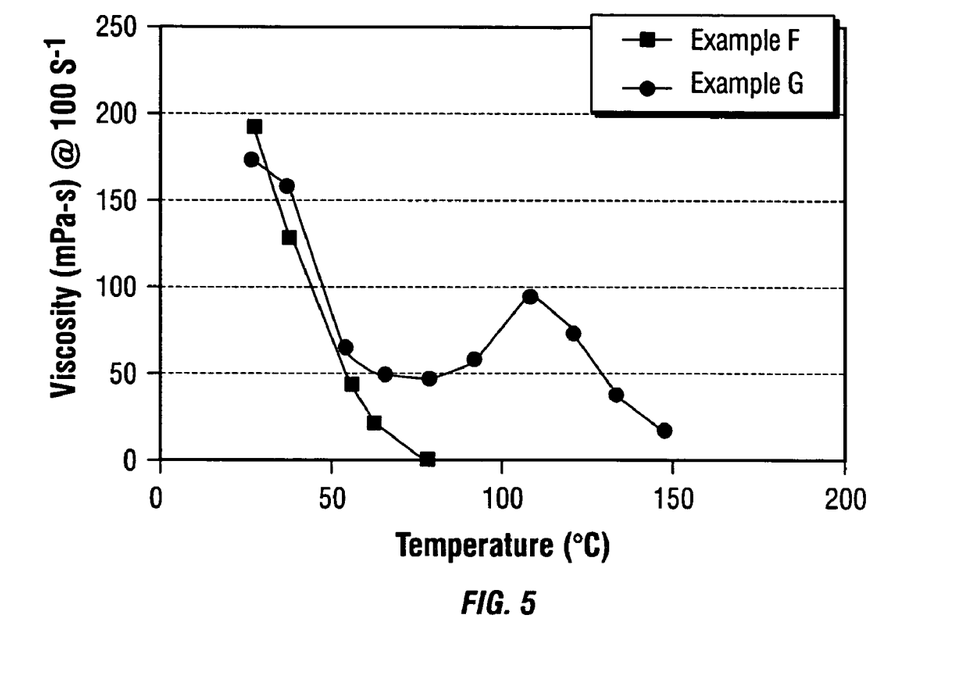
FIG. 5 illustrates viscosity as a function of temperature at a shear rate of 100 s$^{-1}$ for a third category of viscoelastic surfactant fluid that contains carbon nanotubes versus a control without nanotubes.
Figure 6:
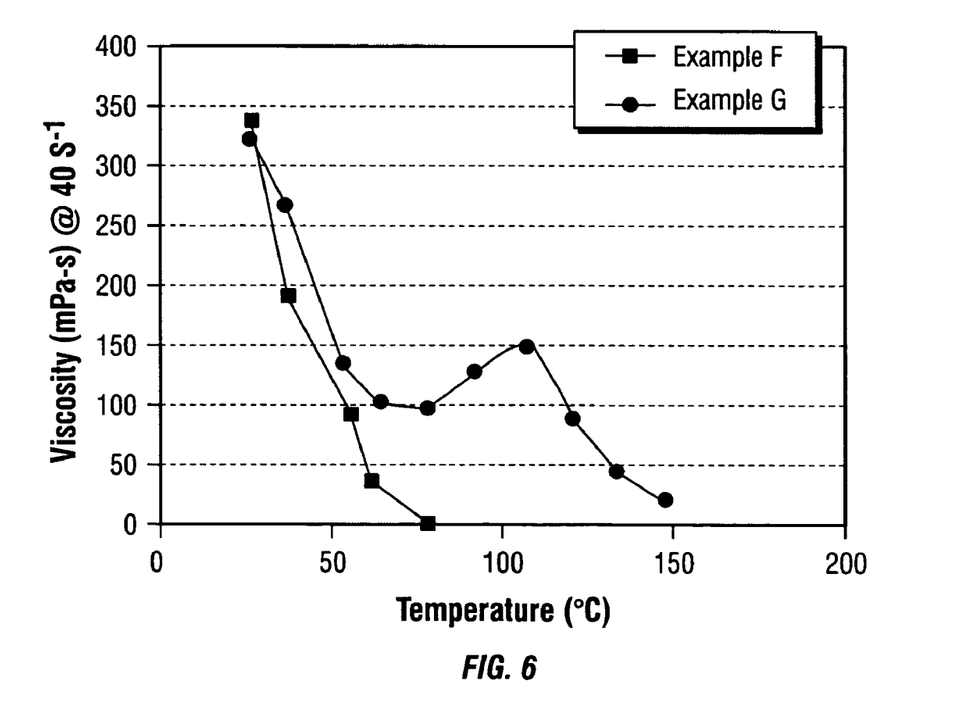
FIG. 6 shows viscosity as a function of temperature at a shear rate of 40 s$^{-1}$ for the same fluids as FIG. 5.

FIG. 5 and FIG. 6 illustrate in graphic form, the viscosity properties of viscoelastic surfactant fluid examples F and G. The data shows significant viscosity increase with incorporated of carbon nanotubes. Comparing example G with example F indicates viscosity properties are maintained and even further increased as temperature is increased, as compared to a significant loss of practical viscosity properties for example F.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A viscoelastic nanotube fluid composition comprising:
   an aqueous medium;
   an amount of a viscoelastic surfactant effective to render said aqueous medium viscoelastic;
   a member selected from the group consisting of organic acids, organic acid salts, inorganic salts, and combinations of one or more organic acids or organic acid salts with one or more inorganic salts; and,
   a nanotube component effective to impart increased viscosity to said fluid composition at temperatures of up to about 150 C.

2. The fluid composition of claim 1 wherein said nanotube component is a carbon nanotube.

3. The fluid composition of claim 2 wherein said carbon nanotube is incorporated in an amount up to 2% by weight based upon total fluid weight.

4. The fluid composition of claim 3 wherein said carbon nanotube is incorporated in an amount from about 0.0 1% to about 1% by weight based upon total fluid weight.

5. The fluid composition of claim 4 wherein said carbon nanotube is incorporated in an amount from about 0.05% to about 0.5% by weight based upon total fluid weight.

6. The fluid composition of claim 1 wherein said nanotube is a single walled nanotube.

7. The fluid composition of claim 1 wherein said nanotube is a multiple walled nanotube.

8. The fluid composition of claim 1 wherein said viscoelastic surfactant is incorporated in an amount from about 0.2% to about 15% by weight based upon total fluid weight.

9. The fluid composition of claim 1 wherein said viscoelastic surfactant is a surfactant represented by a formula selected from the group consisting of:

(i) an amine corresponding to the formula wherein $R_1$ wherein is an alkyl, ailcenyl, arylalkyl, or hydroxyalkyl group wherein each of said alkyl groups contain from about 8 to about 24 carbon atoms and may be branched or straight chained and saturated or unsaturated; and wherein $R_2$, and $R_3$ are independently a hydrogen or an aliphatic chain having from about 1 to about 30 carbon atoms, wherein the aliphatic group can be branched or straight chained, saturated or unsaturated.

(ii) an amine salt corresponding to the formula wherein $R_1$, $R_2$ and $R_3$ are the same as defined herein and X is an inorganic anion; and

(iii) a quaternary ammonium salt corresponding to the formula wherein $R_1$ $R_2$, $R_3$ and $X^{31}$ are the same as defined herein, and $R_4$ is a hydrogen or an aliphatic chain having from about 1 to about 30 carbon atoms, wherein the aliphatic group can be branched or straight chained, saturated or unsaturated.

10. The fluid composition of claim 9 wherein said viscoelastic surfactant is incorporated in an amount from about 0.2% to about 15% by weight based upon total fluid weight.

11. The fluid composition of claim 1 wherein said viscoelastic surfactant is a zwitterionic surfactant represented by a formula:

wherein $R_1$ is an alkyl, alkenyl, arylalkyl, or hydroxyalkyl group wherein each of said alkyl groups contain from about 8 to about 24 carbon atoms and may be branched or straight chained and saturated or unsaturated; and wherein $R_2$, and $R_3$ are independently a hydrogen or an aliphatic chain having from about 1 to about 30 carbon atoms, wherein the aliphatic group can be branched or straight chained, saturated or unsaturated; and, $R_6$ is alkylene or hydroxyalkylene group with chain length from zero to about 6.

12. The fluid composition of claim 11 wherein said zwitterionic viscoelastic surfactant is incorporated in an amount from about 0.5% to about 15% by weight based upon total fluid weight.

13. The fluid composition of claim 1 wherein said viscoelastic surfactant is an amphoteric surfactant represented by a formula:

wherein $R_1$ is an alkyl, alkenyl, arylalkyl, or hydroxyalkyl group wherein each of said alkyl groups contain from about 8 to about 24 carbon atoms and may be branched or straight chained and saturated or unsaturated; and wherein $R_4$ is a hydrogen or an aliphatic chain having from about 1 to about 30 carbon atoms, wherein the aliphatic group can be branched or straight chained, saturated or unsaturated.

14. The fluid composition of claim 11 wherein said amphoteric viscoelastic surfactant is incorporated in an amount from about 0.5% to about 15% by weight based upon total fluid weight.

15. The fluid composition of claim 1 further comprising an alcohol.

16. The fluid composition of claim 15 wherein said alcohol is methanol.

17. The fluid composition of claim 15 wherein said alcohol is iso-propanol.

18. The fluid composition of claim 1 further comprises a proppant.

19. The fluid composition of claim 1 further comprising an additive selected from the group consisting of corrosion inhibitors, fluid-loss additives, and mixtures thereof.

20. The fluid composition of claim 1 further comprising a gas component to provide a foam or energized fluid wherein said gas component comprises a gas selected from the group consisting of nitrogen, air, and carbon dioxide.

21. The fluid composition of claim 1 further comprising a viscosifying agent selected from the group consisting of guar, guar derivatives, hydroxypropyl guar, carboxymethyl guar, carboxymethylhydroxypropyl guar, starch, starch derivatives, hydroxyethyl cellulose, carboxymethylhydroxyethyl cellulose, hydroxypropyl cellulose, xanthan, diutan, polyacrylates, polyDADMAC, clay, and mixtures thereof.

22. The fluid composition of claim 21 wherein said viscosifying agent is in a linear form.

23. The fluid composition of claim 21 wherein said viscosifying agent is in a crosslinked form.

24. A method of fracturing a subterranean formation comprising the step of injecting a viscoelastic nanotube fluid composition comprising a nanotube component effective to impart increased viscosity to the fluid composition at elevated formation temperatures through a wellbore and into a subterranean formation at a pressure sufficient to fracture the formation.

25. A method of gravel packing a subterranean wellbore comprising the step of injecting a viscoelastic nanotube fluid composition comprising a nanotube component effective to impart increased viscosity to the fluid composition at elevated formation temperatures through a wellbore and into a subterranean formation.

26. A method of treating a subterranean wellbore comprising the step of injecting a viscoelastic nanotube fluid composition comprising a nanotube component effective to impart increased viscosity to the fluid composition at elevated formation temperatures into the wellbore, wherein said method of treating a wellbore includes at least one of the following operations: drilling, acid fracturing, scale removing, or matrix acidizing.

27. A method of preparing a carbon nanotube viscoelastic fluid composition comprising the steps of:
  mixing a carbon nanotube component into a viscoelastic surfactant based fluid,
  said nanotube component being effective to impart increased viscosity to the fluid composition; and sonicating the mixture in order to incorporate the carbon nanotube component.

* * * * *